US010648308B2

(12) United States Patent
Chen et al.

(10) Patent No.: US 10,648,308 B2
(45) Date of Patent: May 12, 2020

(54) SOLVENTS AND NCG-CO-INJECTION WITH TAPERED PRESSURE

(71) Applicant: CONOCOPHILLIPS COMPANY, Houston, TX (US)

(72) Inventors: Bo Chen, Katy, TX (US); Thomas James Wheeler, Houston, TX (US); Pradeep Ananth Govind, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 40 days.

(21) Appl. No.: 15/968,087

(22) Filed: May 1, 2018

(65) Prior Publication Data

US 2019/0017361 A1    Jan. 17, 2019

Related U.S. Application Data

(60) Provisional application No. 62/492,613, filed on May 1, 2017.

(51) Int. Cl.
*E21B 43/24* (2006.01)
*E21B 43/16* (2006.01)
*C09K 8/594* (2006.01)
*C09K 8/592* (2006.01)

(52) U.S. Cl.
CPC .......... *E21B 43/2408* (2013.01); *C09K 8/592* (2013.01); *C09K 8/594* (2013.01); *E21B 43/164* (2013.01); *E21B 43/168* (2013.01)

(58) Field of Classification Search
CPC .... E21B 43/305; E21B 43/40; E21B 43/2408; E21B 43/2406; E21B 43/164; E21B 43/168
USPC ........................................................ 166/245
See application file for complete search history.

(56) References Cited

U.S. PATENT DOCUMENTS

| 5,244,041 A * | 9/1993 | Renard .................. E21B 43/24 166/268 |
| 6,230,814 B1 | 5/2001 | Nasr et al. |
| 6,591,908 B2 | 7/2003 | Nasr |
| 8,387,691 B2 | 3/2013 | Sullivan et al. |
| 10,145,226 B2 * | 12/2018 | Yee ........................ E21B 43/24 |
| 2011/0017455 A1 * | 1/2011 | Duong ................ E21B 43/2406 166/303 |
| 2012/0273195 A1 * | 11/2012 | Wheeler ............. E21B 43/2408 166/272.3 |
| 2013/0105147 A1 | 5/2013 | Scott |
| 2015/0083413 A1 | 3/2015 | Salazar et al. |
| 2015/0129201 A1 * | 5/2015 | Winestock .......... E21B 41/0035 166/245 |

(Continued)

*Primary Examiner* — Angela M Ditrani Leff
(74) *Attorney, Agent, or Firm* — Boulware & Valoir

(57) ABSTRACT

A variation of expanding solvent steam assisted gravity drainage (ES-SAGD) production of heavy oil wherein steam and hydrocarbon solvent are co-injected into a heavy oil reservoir and water, hydrocarbon solvent and heavy oil are produced by gravity drainage until the steam chamber is well developed or until oil recovery reaches about 20-30% of oil in place. At that time, the wells are switched to a lateral sweep using non-condensible gas (NSG) and steam co-injection, where more hydrocarbon solvent is recovered than is recovered with ES-SAGD used alone and where the cumulative steam to oil ratio is reduced over using -ES-SAGD alone.

21 Claims, 9 Drawing Sheets

(56) References Cited

U.S. PATENT DOCUMENTS

2015/0198027 A1* 7/2015 Wickramathilaka ... C09K 8/592
166/272.4
2016/0153270 A1 6/2016 Chen et al.
2016/0341021 A1 11/2016 Chen et al.

* cited by examiner

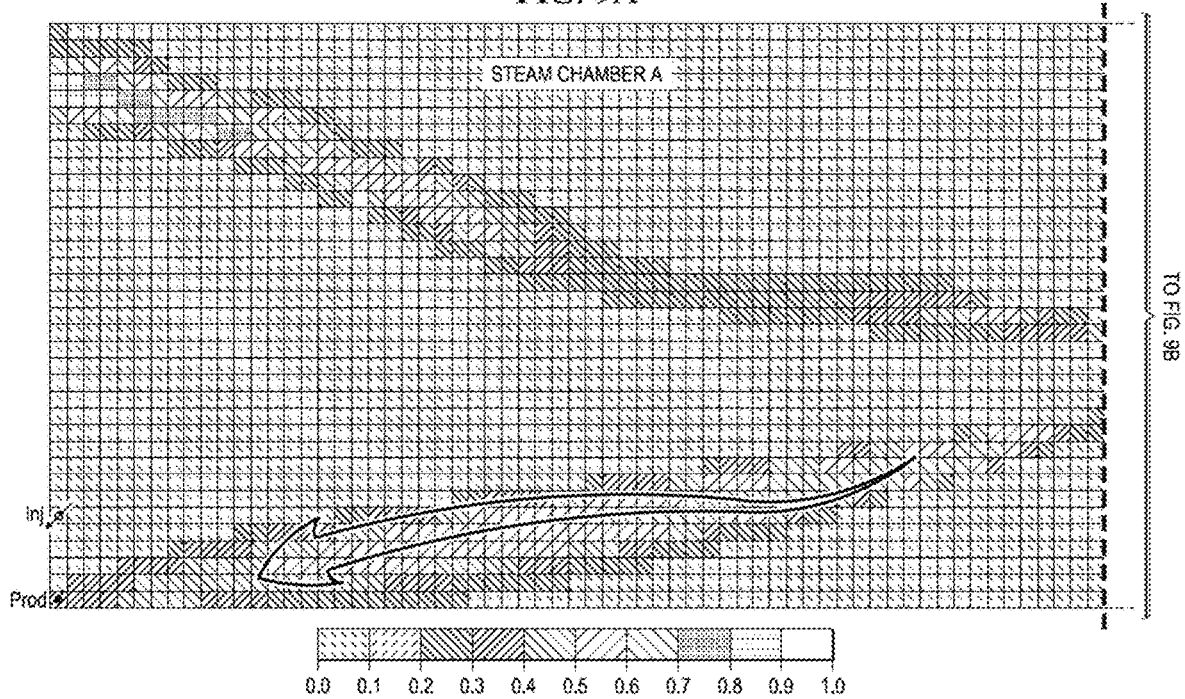
Figure 10: Solvent Return
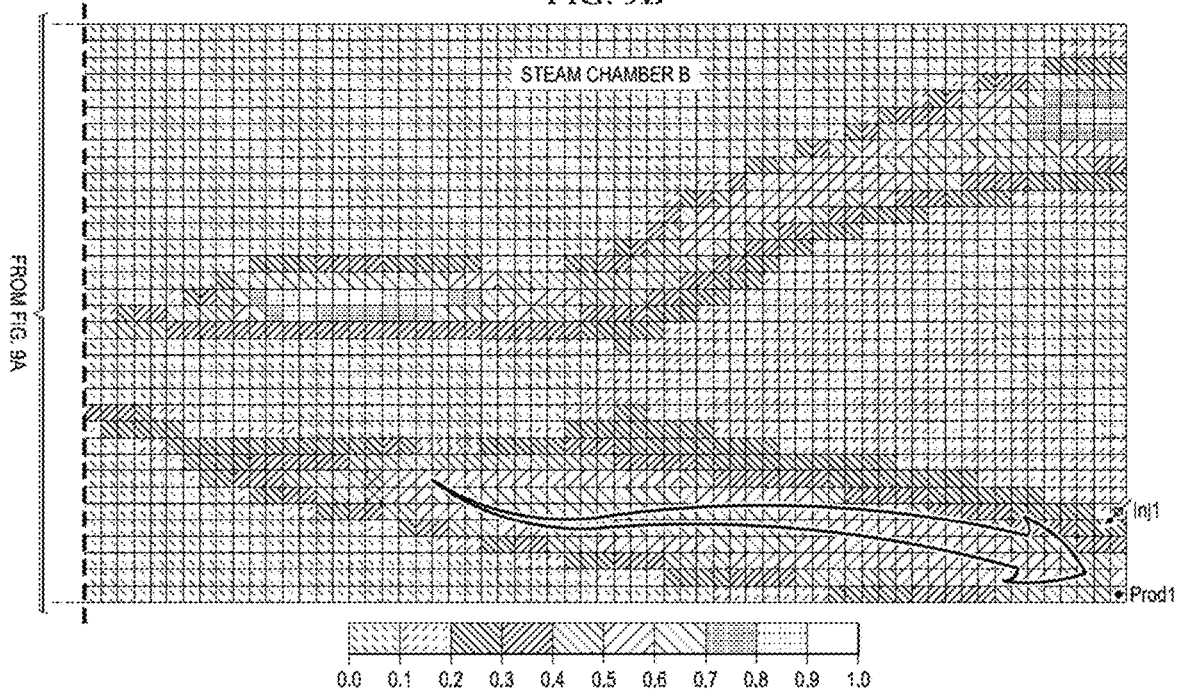

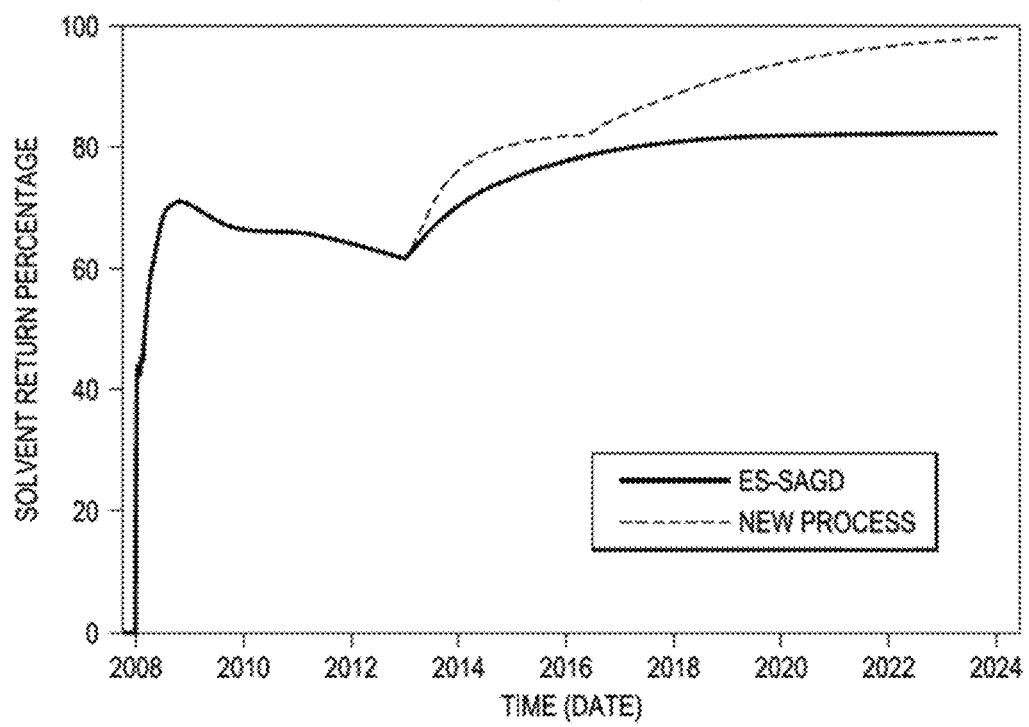

SOLVENTS AND NCG-CO-INJECTION WITH TAPERED PRESSURE

PRIORITY CLAIM

This application is a non-provisional application which claims benefit under 35 USC § 119(e) to U.S. Provisional Application Ser. No. 62/492,613 filed May 1, 2017, entitled "SOLVENTS AND NCG-CO-INJECTION WITH TAPERED PRESSURE," which is incorporated herein in its entirety.

FIELD OF THE INVENTION

This invention relates generally to methods of producing heavy oils using a new variation on Expanding Solvent-SAGD (ES-SAGD) that uses lateral sweep after substantial production with ES-SAGD to drive the solvent to adjacent wells for recovery and reuse.

BACKGROUND OF THE INVENTION

Oil sands are a type of unconventional petroleum deposit. The sands contain naturally occurring mixtures of sand, clay, water, and a dense and extremely viscous form of petroleum technically referred to as "bitumen," but which may also be called heavy oil or tar. Many countries in the world have large deposits of oil sands, including the United States, Russia, and the Middle East, but the world's largest deposits occur in Canada and Venezuela. Bitumen is a thick, sticky form of crude oil, so heavy and viscous (thick) that it will not flow unless heated or diluted with lighter hydrocarbons. At room temperature, bitumen is much like cold molasses. Often times, the viscosity can be in excess of 1,000,000 cP.

Due to their high viscosity, these heavy oils are hard to mobilize, and they generally must be made to flow in order to produce and transport them. One common way to heat bitumen is by injecting steam into the reservoir. Steam Assisted Gravity Drainage (SAGD) is the most extensively used technique for in situ recovery of bitumen resources in the McMurray Formation in the Alberta Oil Sands (Butler, 1991).

In a typical SAGD process, shown in FIG. 1A-B, two horizontal wells are vertically spaced by 4 to 10 meters (m). The production well is located near the bottom of the pay and the steam injection well is located directly above and parallel to the production well. In SAGD, a "startup" or "preheat" period is required before production can begin. The typical startup lasts 3-6 months, and during that time, steam is injected continuously into both wells until the wells are in fluid communication. At that time, the lower well is converted over to a producer, and steam is injected only into the injection well, where it rises in the reservoir and forms a steam chamber.

With continuous steam injection, the steam chamber will continue to grow upward and laterally into the surrounding formation. At the interface between the steam chamber and cold oil, steam condenses and heat is transferred to the surrounding oil. This heated oil becomes mobile and drains, together with the condensed water from the steam, into the production well due to gravity within steam chamber.

This use of gravity gives SAGD an advantage over conventional steam injection methods. SAGD employs gravity as the driving force and the heated oil remains warm and movable when flowing toward the production well. In contrast, conventional steam injection displaces oil to a cold area, where its viscosity increases and the oil mobility is again reduced.

Conventional SAGD tends to develop a cylindrical steam chamber with a somewhat tear drop or inverted triangular cross section. With several SAGD well pairs operating side by side, the steam chambers tend to coalesce near the top of the pay, leaving the lower "wedge" shaped regions midway between the steam chambers to be drained more slowly, if at all. Operators may install additional producing wells in these midway regions to accelerate recovery, as shown in FIG. 2, and such wells are called "infill" wells, filling in the area where oil would normally be stranded between SAGD well-pairs.

Although quite successful, SAGD does require enormous amounts of water in order to generate a barrel of oil. Some estimates provide that 1 barrel of oil from the Athabasca oil sands requires on average 2 to 3 barrels of water, although with recycling the total amount can be reduced to 0.5 barrel. In addition to using a precious resource, additional costs are added to convert those barrels of water to high quality steam for downhole injection. Therefore, any technology that can reduce water or steam consumption has the potential to have significant positive environmental and cost impacts.

One method of reducing steam use is to co-inject a solvent with the steam into the reservoir. Currently, expanding solvent-SAGD or "ES-SAGD" is being tested and is demonstrating promising results. The underlying theory is for steam to condense, contributing latent heat to the formation, followed by the condensation and diffusion of the liquid solvent into the bitumen. This decreases the viscosity of the heavy oil, consequently increasing the rate of production and the overall recovery more than a process driven solely by steam. The steam oil ratio (SOR) will thereby be reduced.

In practice, to make the ES-SAGD economical, the solvent is recovered and reused. However, the injected solvent often gets trapped in reservoir formations of poor quality, such as inclined heterolithic stratification ("IHS") beds/surfaces that overlay sandstone layers at the top of pay. For example, bitumen reservoirs dominated by inclined heterolithic stratification (IHS) are found in large point bars of the Aptian (Lower Cretaceous) McMurray Formation in the northwestern part of the Corner oil sand lease (Alberta, Canada). In such reservoirs, the solvent moves further away from the drainage interface via diffusion/dispersion and fingering, resulting in solvent not being recovered in a timely fashion and reducing the overall cost effectiveness of ES-SAGD. This phenomenon of higher solvent retention has a negative impact on field development economics when solvent processes are applied.

Therefore, although beneficial, the ES-SAGD concept could be further developed to address some of these disadvantages or uncertainties. In particular, a method that reduces solvent retention, especially in reservoirs with significant inclined heterolithic stratification, would be beneficial.

SUMMARY OF THE DISCLOSURE

Current ES-SAGD practice involves drilling horizontal production wells low in the reservoir pay interval and horizontal steam injection wells approximately 3-10 meters above (usually about 5) and parallel to the producing wells. Well pairs may be spaced between 50 and 150 meters laterally from one another in parallel sets to extend drainage across reservoir areas developed from a single surface drilling pad.

Typically both production and injection wells are preheated by circulating steam or steam plus solvent from the surface down a toe tubing string that ends near the toe of the horizontal liner; steam condensate returns through the tubing-liner annulus to a heel tubing string that ends near the liner hanger and flows back to the surface through this heel tubing string. After such a period of "startup" circulation in both the producer and the injector wells for a period of about 3-6 months, the two wells in a given wellpair will reach fluid communication. The reservoir midway between the injector and producer wells will reach a temperature high enough (50-100° C.) so that the bitumen becomes mobile and can drain by gravity downward, while live steam vapor ascends by the same gravity forces to establish a steam chamber. At this time, the wellpair is placed into ES-SAGD operation with co-injection of solvent and steam only in the upper well and production from the lower well, and production can begin.

This invention proposes a novel accelerated recovery process in which steam or steam and solvent are co-injected in a heavy oil/oil sands reservoir for a period of time, followed by non-condensable gas (NCG) and steam co-injection in conjunction with a lateral sweep strategy.

In a solvent-steam co-injection process, the injected solvent generally gets trapped in reservoir formation of poor quality, such as IHS beds/surfaces that overlay sandstone layers at the top of pay, and moves further away from the drainage interface via diffusion/dispersion and fingering, thus resulting in solvent not being recovered in a timely fashion. This phenomenon of higher solvent retention has a negative impact on field development economics, when these solvent processes are applied.

The proposed process utilizes conventional horizontal SAGD well-pair configuration initiated with steam or solvent-steam co-injection, followed by NCG-steam co-injection, while triggering a tapered pressure lateral sweep strategy from one well pair to the next across a pad to enhance oil and solvent recovery.

The SAGD or ES-SAGD startup quickly ramps up oil production and establishes a steam chamber that allows sufficient thermal energy to be transferred to the overlaying IHS surfaces by heat conduction. Subsequently, NCG-steam co-injection effectively promotes countercurrent flow within the formation, in which NCG moves upward and accumulates at the top of the reservoir, draining both the ready-to-move heated bitumen and displacing the trapped solvent while maintaining the local pore pressure.

Concurrently, the tapered pressure lateral sweep process, which is accomplished by increasing the chamber pressure of a drainage area (DA) while shutting-in the injector of the neighboring wellpair, takes advantage of steam and NCG override and pressure drawdown towards the producer to accelerate the mobile oil and solvent within the wedge region to move towards the producer of the well pair with the injector shut-in. One or both members of the driving wellpair can be converted to steam injection, laterally driving oil to a neighboring producer. Generally speaking, the lateral drive is applied sequentially to the next adjacent wellpair, thus gradually driving the oil across the play.

The new process has the combined advantages of solvent-steam co-injection, NCG-steam co-injection and tapered pressure lateral sweep strategy in terms of accelerated oil recovery, reduced steam-oil-ratio, faster and effective solvent recovery with a greater magnitude. Our simulation results suggest that the accelerated oil recovery with the new process results in a significant accelerated recovery, thereby reducing wellpair life, and reducing risk of mechanical failure. A 10-30% reduction in cumulative steam-oil ratio compared to conventional SAGD and ES-SAGD processes is also provided.

In addition, the new process helps in significantly reducing solvent retention (by as much as 20%) as compared to a conventional ES-SAGD process.

The invention can comprise any one or more of the following embodiments, in any combination(s):

A method for production of heavy oil, the method comprising:

a) providing an array of wellpairs, each wellpair comprising an injection well 2-10 meters over a production well positioned low in a payzone of a heavy oil reservoir;

b) producing heavy oil and water and hydrocarbon solvent at each said production well by co-injecting steam and a hydrocarbon solvent into each said injection well and gravity drainage to each said production well of said array of wellpairs for a period of time; and c) co-injecting a noncondensible gas (NCG) and steam in a lateral sweep from an injection well of a first wellpair towards a second adjacent wellpair at a lower pressure and producing heavy oil and water and hydrocarbon solvent at a production well of said second wellpair;

d) co-injecting a noncondensible gas (NCG) and steam in a lateral sweep from an injection well of said first and second wellpairs towards a third adjacent wellpair at a lower pressure and producing heavy oil and water and hydrocarbon solvent at a production well of said third adjacent wellpair, and repeating one or more times for a next adjacent wellpair, thereby providing a tapered lateral sweep over said array of wellpairs;

e) wherein more hydrocarbon solvent is recovered using step c-d, than is recovered without step c-d.

A method for production of heavy oil, the method comprising:

a) providing an array of wellpairs, each wellpair comprising an injection well 2-10 meters over a production well positioned low in a payzone of a heavy oil reservoir;

b) producing heavy oil and water and hydrocarbon solvent at each said production well by co-injecting steam and a hydrocarbon solvent into each said injection well and gravity drainage to each said production well of said array of wellpairs for a period of time; and c) co-injecting a noncondensible gas (NCG) and steam into an injection well of a first wellpair at a high pressure and laterally sweeping oil from said first wellpair towards a second adjacent wellpair with a shut in injector well at a lower pressure, and producing heavy oil and water and hydrocarbon solvent at a production well of said second wellpair;

d) co-injecting a noncondensible gas (NCG) and steam into an injection well of said first and second wellpairs at a high pressure and laterally sweeping oil from said first and second wellpairs towards a third adjacent wellpair with a shut in injector well at a lower pressure, and producing heavy oil and water and hydrocarbon solvent at a production well of said third wellpair, and repeating one ore more times for a next adjacent wellpair;

wherein more hydrocarbon solvent is recovered using step c-d, than is recovered without step c-d.

An improved method of expanding solvent steam assisted gravity drainage (ES-SAGD) production of heavy oil wherein steam and hydrocarbon solvent are co-injected into a heavy oil reservoir and water, hydrocarbon solvent and heavy oil are produced by gravity drainage in each of an array of wellpairs, the improvement comprising performing ES-SAGD for a period of time in each of said array of wellpairs until oil recovery reaches about 20-30% of oil in place, and then switching to a tapered lateral sweep over said array of wellpairs using NCG and steam co-injection, wherein more hydrocarbon solvent is recovered than is recovered with ES-SAGD used alone.

An improved method of expanding solvent steam assisted gravity drainage (ES-SAGD) production of heavy oil wherein steam and hydrocarbon solvent are co-injected into a heavy oil reservoir and water, hydrocarbon solvent and heavy oil are produced by gravity drainage, the improvement comprising performing ES-SAGD for a period of time until oil recovery reaches about 20-30% of oil in place, and then switching to a tapered lateral sweep using NCG and steam co-injection over an array of wellpairs, wherein a lower cumulative steam-oil ratio is achieved with said method as compared to using ES-SAGD alone.

An improved method of ES-SAGD production of heavy oil wherein steam and hydrocarbon solvent are co-injected into an injection well in a heavy oil reservoir and water, hydrocarbon solvent and heavy oil are produced by gravity drainage at a production well that is paired with and below said injection well, the improvement comprising performing ES-SAGD for a period of time until oil recovery reaches about 20-30% of oil in place, and then switching to a tapered lateral sweep using NCG and steam co-injection at said injection well and water, hydrocarbon solvent and heavy oil are produced at a production well adjacent said wellpair and progressively driving oil using said tapered lateral sweep over an array of wellpairs, wherein more hydrocarbon solvent is recovered than is recovered with ES-SAGD used alone.

Any method herein, wherein the hydrocarbon solvent is a pentane, hexane, heptane, octane, nonane, decane, undecane, dodecane, tridecane, tetradecane, linear and cyclic paraffins, diluent, kerosene, light and heavy naphtha, and mixture thereof.

Any method herein, wherein the hydrocarbon solvent is selected from C5-C9 hydrocarbons, and mixtures thereof.

Any method herein, wherein said NCG are selected from the group consisting of air, carbon dioxide (CO2), nitrogen (N2), carbon monoxide (CO), hydrogen sulfide (H2S), hydrogen (H2), anhydrous ammonia (NH3), flue gas, and combinations thereof. Preferably, the NCG comprises CO2.

Any method herein, wherein the injectors are shut in for the tapered lateral sweep steps, leaving the producer open for production.

Any method herein, wherein both wells of a wellpair are used for injection in a tapered lateral sweep towards an adjacent wellpair having a lower pressure and a shut in injector well (and a producing producer well). Thus, no oil is produced from the high pressure wellpairs, which only function to drive oil to the lower pressure adjacent wellpair(s).

Any method herein, wherein an injection well of a wellpair is used for injection in a tapered lateral sweep towards an adjacent wellpair having a lower pressure and a shut in injector well (and a producing producer well). Thus, the producer well of the high pressure wellpair(s) are still configured for production.

Any method herein, wherein said injection well is vertically stacked directly over a production well in a given wellpair.

Any method herein, wherein said method is preceded by a steam start-up period wherein steam is injected into an injection well and a production well until said injection well and said production well are in fluid communication, and then said production well is converted to production use.

Any method herein, wherein said start-up period uses steam and hydrocarbon solvent co-injection.

Any method herein described, wherein said producer well and said injector well are vertically stacked horizontal wells. They could also be staggered horizontal wells about 4-10 m apart in the lateral plane, preferably about 5 meters apart. Other non-traditional well arrangements could also be used. In one arrangement, the injection well is 5-10 m laterally and 3-10 m vertically stacked over a production well in a given wellpair.

Any method herein described, wherein both the producer and injector are used for injection in the high pressure wells that drive oil to the adjacent low pressure wells.

Any method herein described, wherein said one or more solvents is methane, ethane, propane, butane, pentane, hexane or mixtures thereof. An NGL could also be used. Most preferred in an NGL condensate produced at or near said wells.

As used herein, "NGL" or natural gas liquids are components of natural gas that are separated from the gas state in the form of liquids. This separation occurs in a field facility or in a gas processing plant through absorption, condensation or other method. Natural gas liquids are classified based on their vapor pressure: Low=condensate, Intermediate=natural gas, High=liquefied petroleum gas. Examples of NGLs used herein include ethane, propane, butane, isobutane and pentane.

As used herein, a "noncondensable" gas or "NCG" is a gas from chemical or petroleum processing units (such as distillation columns or steam ejectors) that is not easily condensed by cooling. NCG consists mostly of nitrogen, light hydrocarbons, carbon dioxide, or other gaseous materials.

"Vertical" drilling is the traditional type of drilling in oil and gas drilling industry, and includes well <45° of vertical.

"Horizontal" drilling is the same as vertical drilling until the "kickoff point" which is located just above the target oil or gas reservoir (pay zone), from that point deviating the drilling direction from the vertical to horizontal. By "horizontal" what is included is an angle within 45° (≤45°) of horizontal. All horizontal wells will have a vertical portion, but the majority of the well is within 45° of horizontal.

As used herein, it is understood that injecting "steam" may include some injection of hot water as the steam loses heat and condenses or a wet steam was used.

The productivity, or volume of oil produced per unit of steam consumed, can be determined from the "steam-to-oil ratio" or "SOR," with less productive zones determined by a higher steam-to-oil ratio than more productive zones. Other techniques can be used to measure productivity, such as oil rate, and it can be understood that these techniques may be used in place of SOR at any point SOR is referenced, herein.

By "lateral sweep", what is meant is that injection incurs at point A and oil is swept laterally towards point B.

By "tapered" what is meant is the gradual reduction in a feature (in this case pressure) across an array of wellpairs over time.

By "tapered pressure lateral sweep" or "tapered lateral sweep" what is meant is that pressure is increased in one well or well pair, driving oil laterally down the pressure gradient to an adjacent well or wellpair, and the process continues down the line to the next wellpair and the next. The tapering can occur in either direction, however, either gradually decreasing the zone of low pressure from one end to the other as shown in FIG. 11A or gradually decreasing the zone of high pressure, as shown in FIG. 11B.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| | |
|---|---|
| SAGD | Steam assisted gravity Drainage |
| ES-SAGD | expanding solvent SAGD, aka E-SAGD or enhanced SAGD |
| IHS | inclined heterolithic stratification |

BRIEF DESCRIPTION OF DRAWINGS

FIG. 5 2D Layered Simulation Model.

FIG. 9A Steam Chamber A Solvent (C6) Oil Phase Molar Fraction and Oil Flux.

FIG. 9B Steam Chamber B Solvent (C6) Oil Phase Molar Fraction and Oil Flux.

FIG. 10 Solvent Return for ES-SAGD and inventive process,

DETAILED DESCRIPTION OF THE DISCLOSURE

Figure 1A:
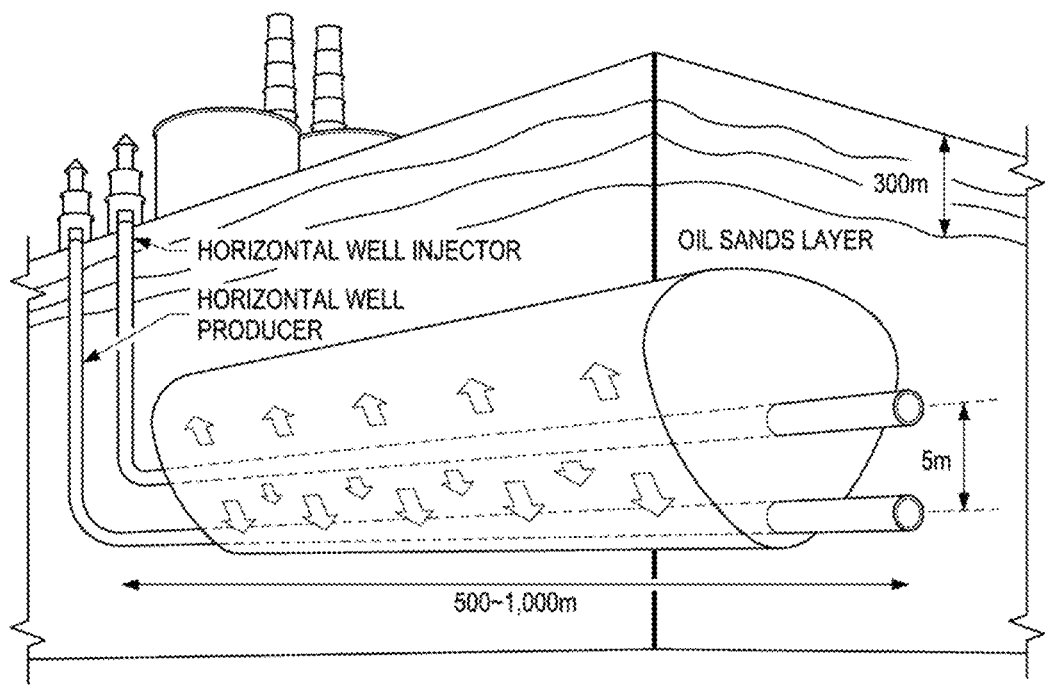
FIG. 1A shows a conventional SAGD well pair, which can also be used in ES-SAGD.
Figure 1B:
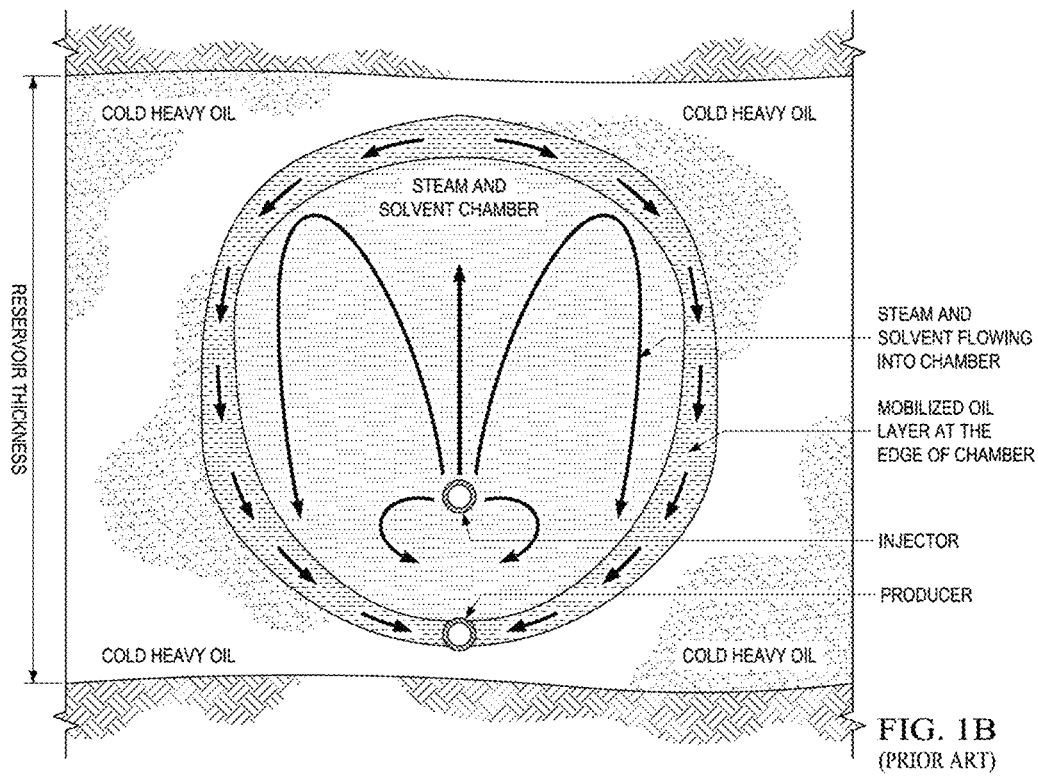
FIG. 1B shows a schematic of the ES-SAGD steam/solvent chamber.
Figure 2:
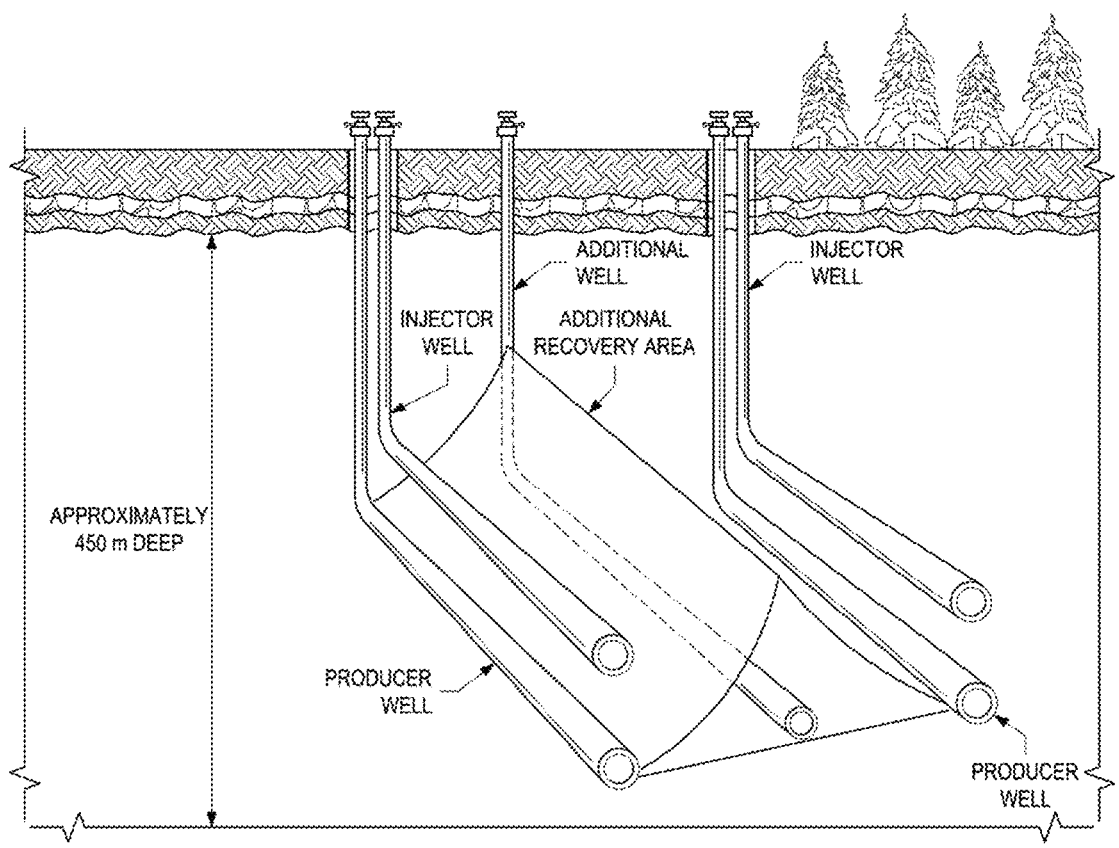
FIG. 2 shows the addition of an additional production well between a pair of SAGD or ES-SAGD well pairs to try to capture the "wedge" of oil between pairs of well pairs that is typically left unrecovered. This midpoint lower well in known as an "infill" well.

The following is a detailed description of the preferred method of the present invention. It should be understood that the inventive features and concepts may be manifested in other arrangements and that the scope of the invention is not limited to the embodiments described or illustrated. The scope of the invention is intended to only be limited by the scope of the claims that are appended hereto.

The present invention provides a novel heavy oil production method, wherein heavy oil is initially produced using the typical ES-SAGD process until a mature steam chamber is achieved. Then, the methodology is switched to NCG-steam co-injection and lateral sweep. An adjacent well pair (or all bracketing wellpairs) are shut in and co-injection of NCG and steam laterally sweeps oil down the pressure gradient from the injection wellpair towards the adjacent wellpair(s).

In the proposed process, the hydrocarbon solvents for ES-SAGD startup considered are C3-C10 with a variant composition of 0.1-50 mol % in the injection steam.

The co-injected NCG can be nitrogen, methane, air, carbon dioxide, flue gas, or a mixture of these gases with a variant composition of 0.1-90 mol % in the injection stream.

This concept may also apply to any thermal recovery process used during startup, including but not limited to SAGD, ES-SAGD, steam drive, CSS-steam drive, etc. The injectants used in the startup phase, including but not limited to hydrocarbon solvents, surfactants, chemical additives etc. This new process is applicable to different wellbore architecture/configurations, such as fishbones, flow control devices etc. with and without use of infill wells.

Co-injection of solvent with steam is well known as ES-SAGD and is considered by many oil sands operators as a game-changer to recover in-situ bitumen for accelerated oil recovery and lower greenhouse gas (GHG) emissions, as compared to steam-only processes, i.e., SAGD. In this process, hydrocarbon-based solvents are co-injected along with steam. When contacting with bitumen at the chamber interface, the solvents condense and dissolve into bitumen, leading to further reduction in oil viscosity in addition to latent heat delivery by steam thus resulting in faster oil recovery.

This process, however, is of high cost due to high solvent cost and the risk of low solvent recovery in field applications due to reservoir heterogeneity. The co-injected solvents generally get trapped in smaller pore throats due to capillary forces and adsorption, as well as in regions of permeability contrast due to geologic heterogeneity. Moreover, a fraction of the solvent moves further away from the drainage interface by means of diffusion/dispersion and fingering. This phenomenon of solvent retention is a major impediment to the commercially successful application of ES-SAGD.

On the other hand, NCG-steam co-injection has demonstrated that it can efficiently recover mobile liquids, such as heated bitumen and solvents from reservoir formation of low quality, e.g. the IHS layers at the top portion of the reservoir, when a countercurrent flow environment is established. This environment can be achieved by an adequate duration of ES-SAGD operation as an initial phase of recovery. With the rising and lateral spread development of steam chamber in the startup phase, sufficient energy from latent heat of steam is transferred to the IHS layers mobilizing the bitumen with elevated temperature.

When injecting NCG, NCG moves upward and invades the IHS layers, providing pore pressure support, while bitumen and solvent are drained by gravity and flows downward. The counter-current displacement by NCG develops sufficient gas concentration, which reduces heat losses to the overburden and effectively recovers heated bitumen and solvents, therefore, resulting in 1) improved margins through reduced operating costs, 2) improved solvent recovery, 3) lower Steam-Oil Ratio due to production acceleration, and 4) reduced environmental foot print through lower GHG emissions relative to the traditional SAGD process.

Figure 3:
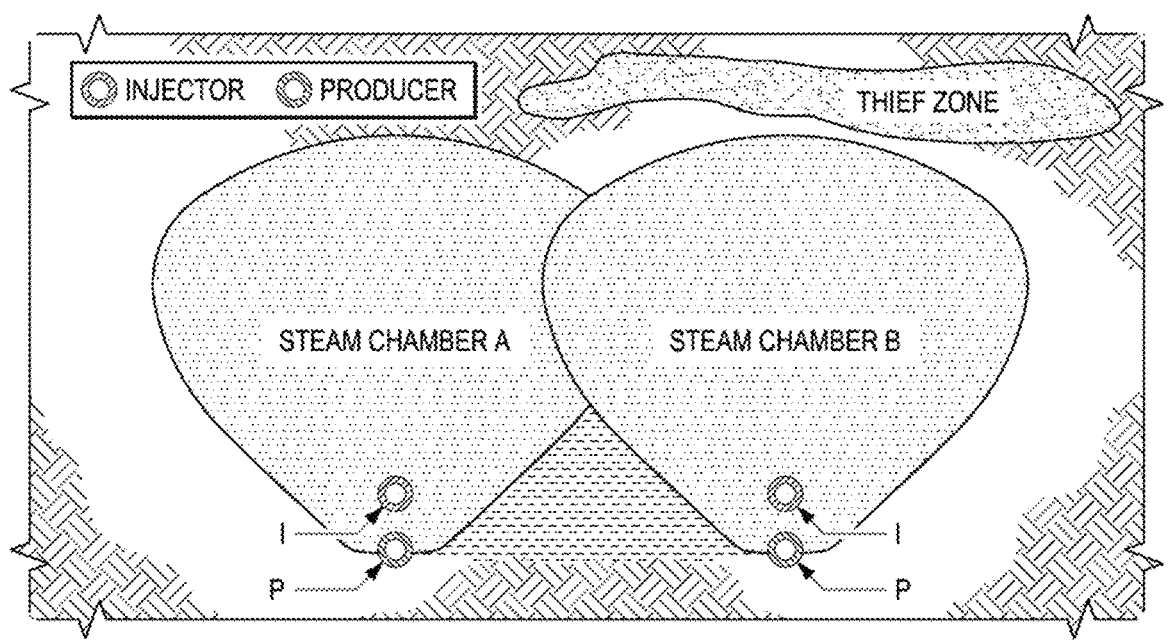
FIG. 3 Coalesced Steam Chambers A & B with thief zone trapping co-injected solvent.
Figure 4:
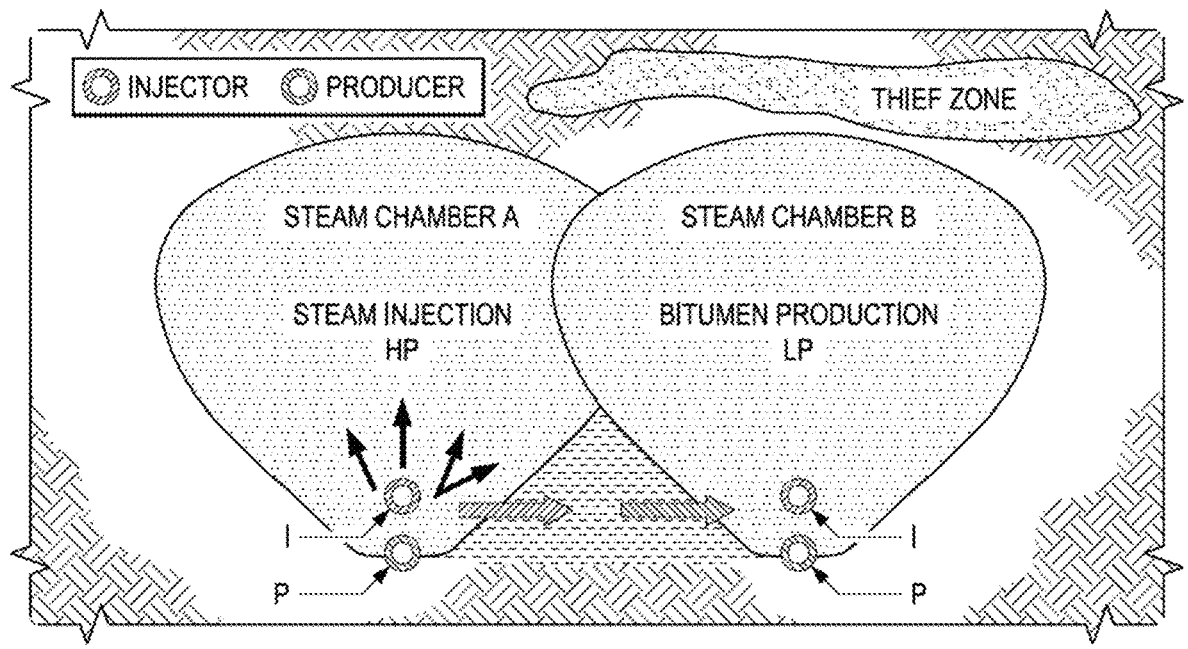
FIG. 4 Lateral Sweep Methodology.

In addition, oil wedge between coalesced steam chambers (FIG. 3) cannot be effectively recovered using conventional SAGD or ES-SAGD wellpair configuration without an additional infill producer, due to the decreasing angle of drainage. The tapered pressure lateral sweep strategy is achieved by shutting-in injector in well pair B and increasing injection pressure in well pair A. The rising pressure in the injecting pair will pressure up this chamber, and laterally displace fluids from A towards B utilizing the pressure differential between steam chambers as shown in FIG. 4, resulting in an increase in oil production & solvent recovery through an improved sweep efficiency mechanism. Thus, infill oil can be collected by the lateral sweep, without the need of drilling the additional infill well.

The proposed new process combines the two co-injection processes, with the tapered pressure lateral sweep strategy utilizing the conventional horizontal wellpairs. The process co-injects solvents with steam at the early well life until a mature chamber is established, which is usually indicated by chamber coalescence and/or oil recovery of 20-30%. Then, the process is switched to NCG-steam co-injection concurrent with the tapered pressure lateral sweep strategy.

Figure 5:
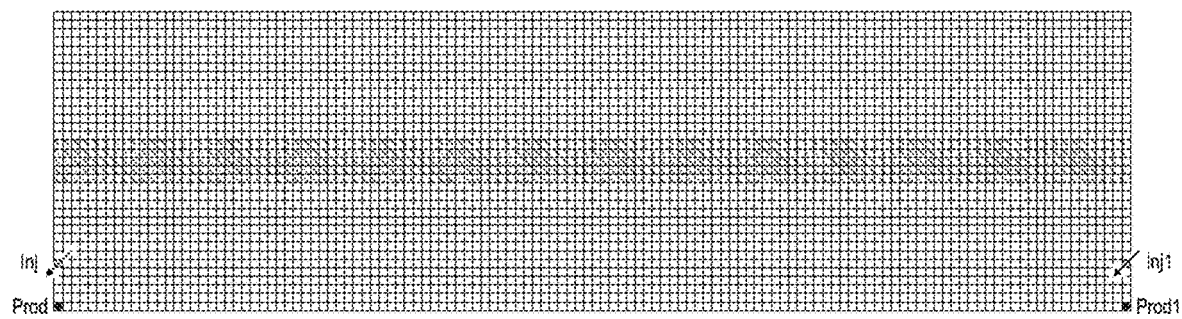

To evaluate the invented process, simulation runs with a 2D layered model were conducted using CMG STARS™. FIG. 5 shows the simulation model that represents a repeatable pattern of a 125 m×1000 m×35 m region by symmetry. The model consists of two half SAGD wellpairs with the producer located at the bottom and the injector 5 m above, The layered model has two facies, sandstone and IHS. A 5 m IHS layer is inter-bedded in the sandstone pay, as showed in FIG. 5. The Surmont average reservoir properties were used in the simulation.

Three cases were studied by computer simulation for performance comparison. The new process co-injects 10 vol % hexane (C6) along with steam for 5 years followed by 1 mol % methane ($CH_4$) co-injected with steam. At the same time that injection is switched from hexane to methane, steam chamber A pressure is increased by 3000 kPa from the initial pressure of 2500 kPa, achieving the pressure differential between chambers A and B and pressure drawdown towards the producer in chamber B. The other two cases are the ES-SAGD case that co-injects 10 vol % C6 with steam for 5 years followed by steam only injection, and SAGD case that injects steam only.

In this simulation Oil/Solvent was produced at both producer wells A & B, and Injector B has been shutin. However, if desired, e.g., one had an injectivity issue, you could inject into both wells in "A" and shut in the injector in "B". One could also keep injection into B, though it is less efficient as you are no longer maximizing the viscous drive from "A" to "B".

Figure 6:
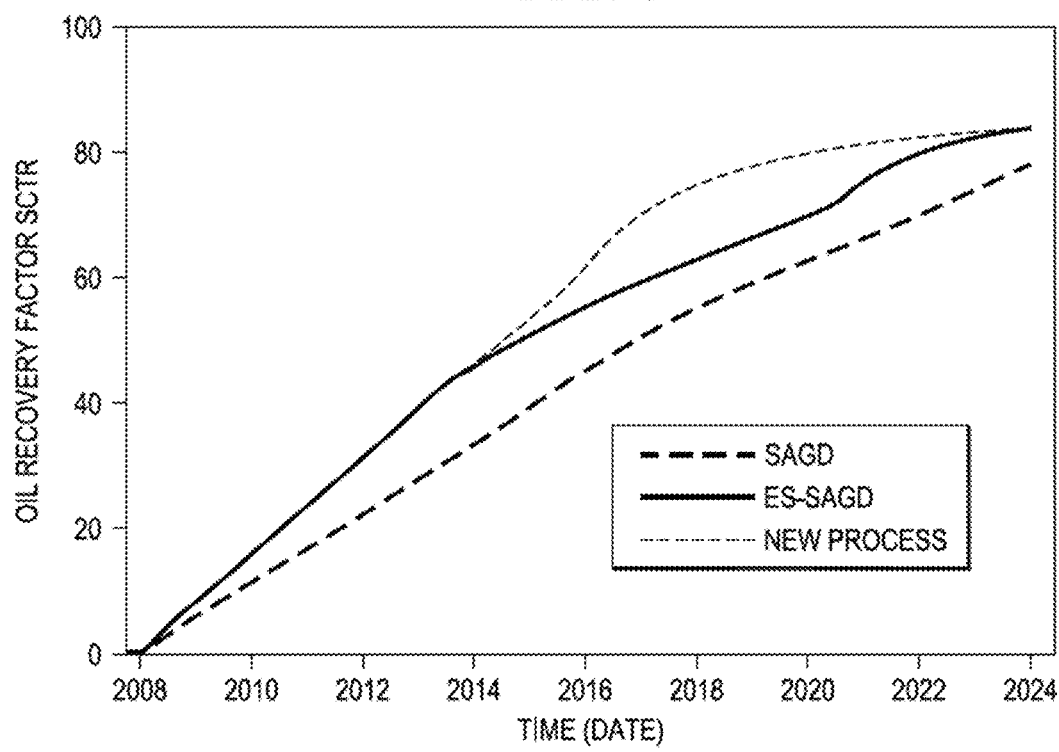
FIG. 6 Oil Recovery Factor for SAGD, ES-SAGD and inventive process.
Figure 7:
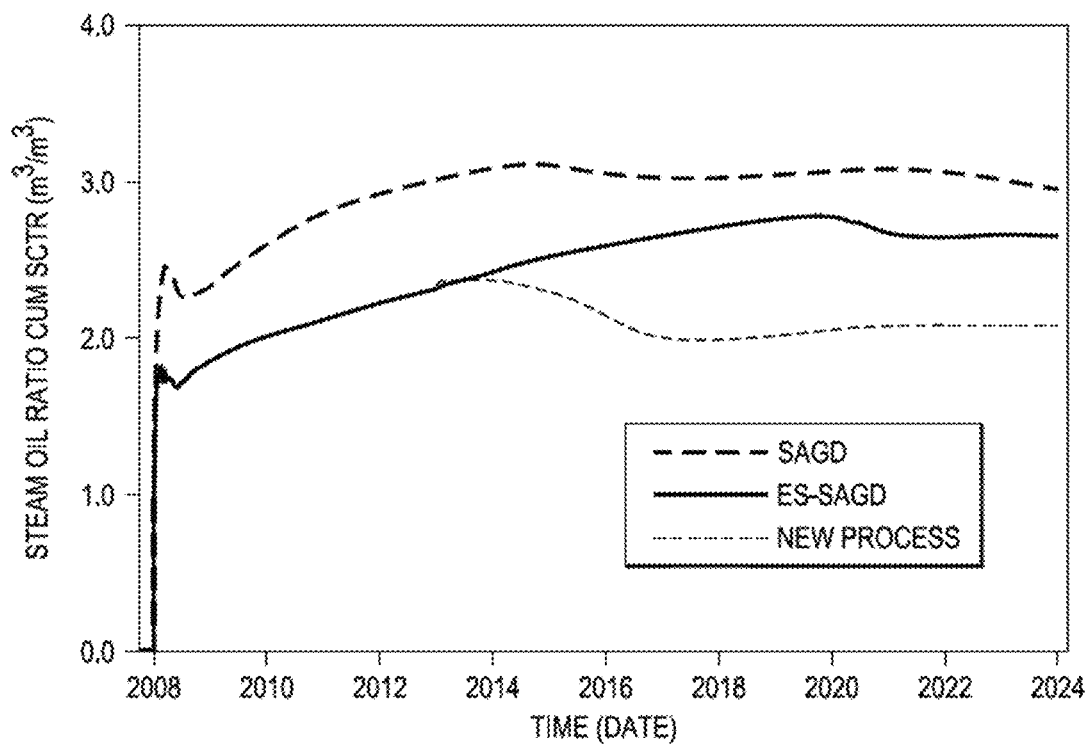
FIG. 7 Cumulative Steam-Oil Ratio.
Figure 8A:
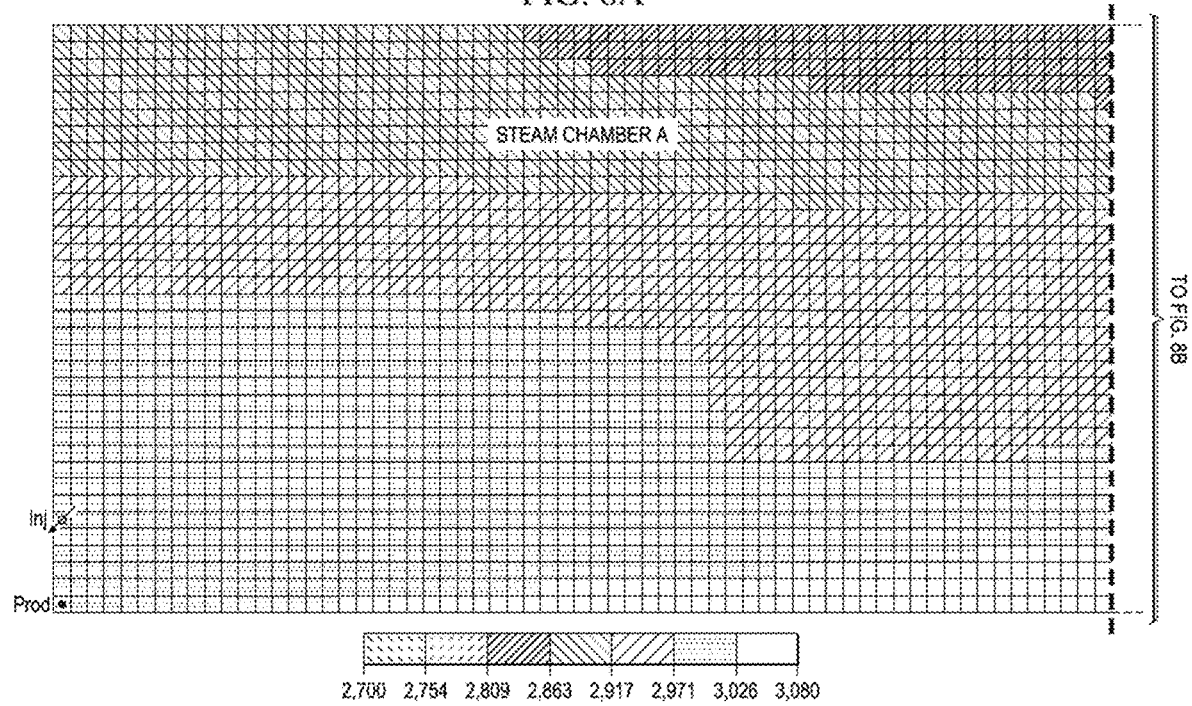
FIG. 8A Steam Chamber A Pressure, kPa.
Figure 8B:
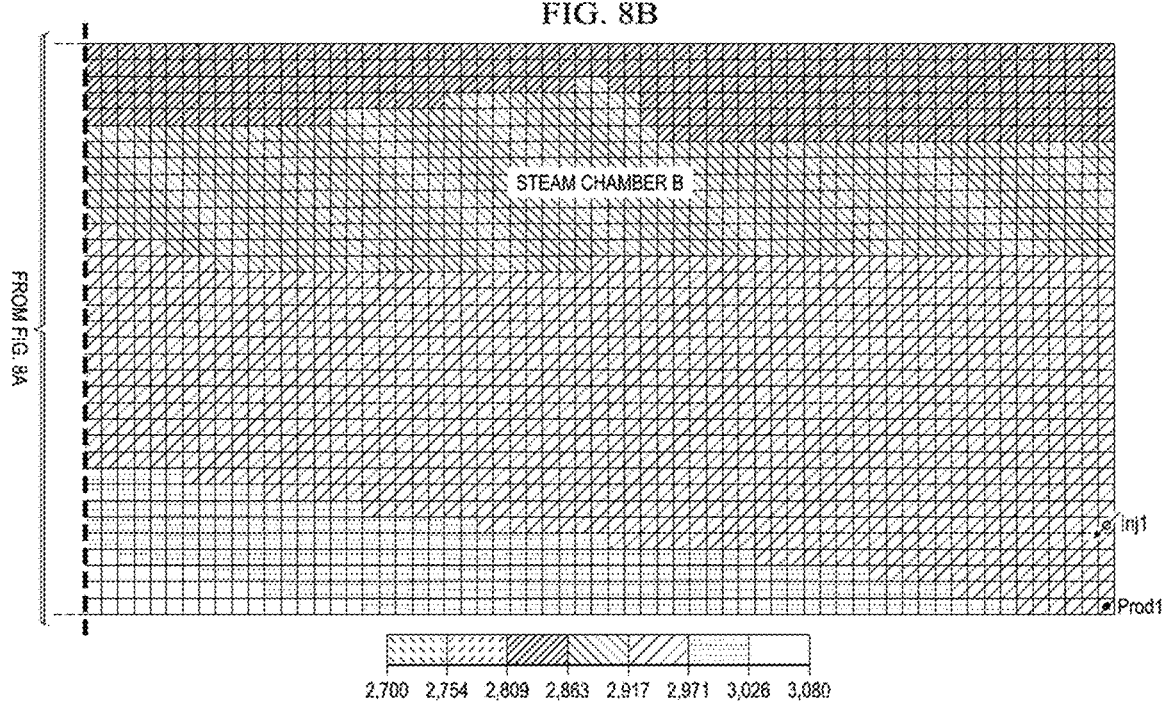
FIG. 8B Steam Chamber B Pressure, kPa.

FIG. 6 and FIG. 7 compare the simulation results of oil recovery and cumulative steam-oil ratio, respectively. The new process outperforms the other two cases, as evident by the fastest oil recovery and the lowest cumulative steam-oil ratio.

FIG. 8A-B and FIG. 9A-B show the pressure differential between chambers A and B with solvent and oil flux moving towards the producer in chamber B after initiating NCG co-injection and tapered pressure lateral sweep strategy respectively.

FIG. 10 shows solvent return for the new process and ES-SAGD case. The retained solvent in the reservoir is more effectively recovered with NCG co-injection in conjunction with the tapered pressure lateral sweep strategy after solvent co-injection operation.

Figure 11A:
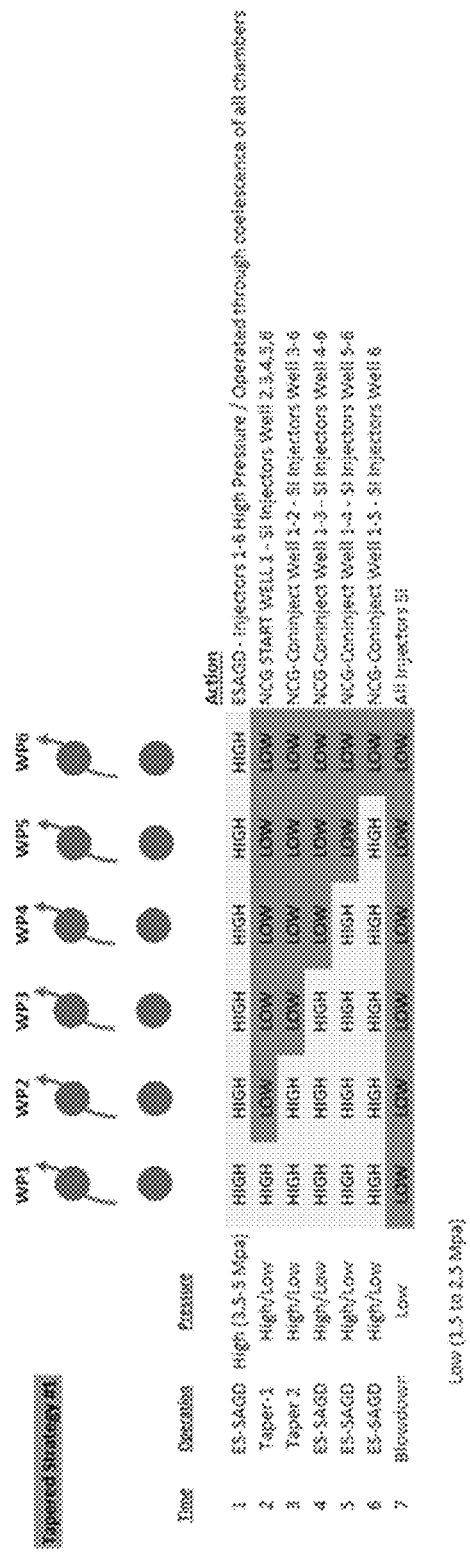
FIG. 11A A tapering low pressure zone, traveling from left to right, as high pressure is applied starting at the wellpair 1 (wp1), then wellpair 1 and 2, then 1 and 2 and 3, and so on. Thus, oil is driven down the pressure gradient to wellpair 6.
Figure 11B:
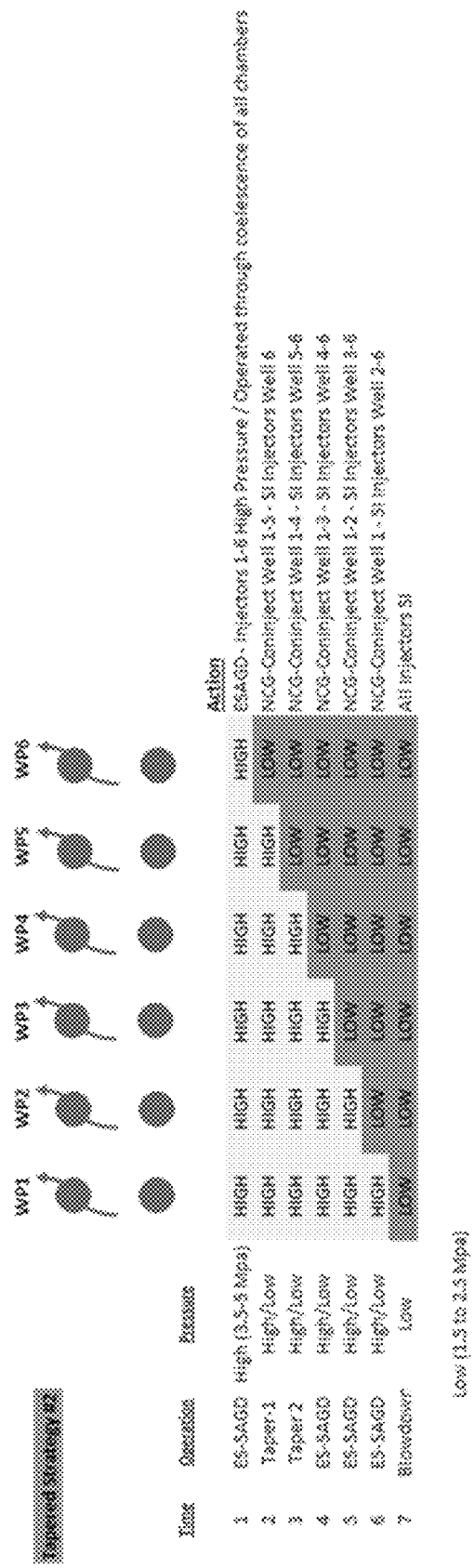
FIG. 11B. A tapering high pressure zone, travelling from right to left.

The tapering strategy is shown in FIG. 11. In FIG. 11A, the low pressure zones tapers from the left towards the right, driving oil laterally to the right. In FIG. 11B, by contrast, the high pressure zone tapers from right to left, still driving oil to the right. In the low pressure zones, the injectors are shut in (SI), and oil is produced at the producer. In the high pressure zones, there can be an injector and a producer, or both can be converted to injectors. Timing may be 3-24 months for each stage, depending on the thickness of the pay, the API of the oil, and the temperatures and pressures employed.

Although particularly beneficial in gravity drainage techniques, this is not essential and the configuration could be used for horizontal sweeps as well. Thus, the methods and configurations can also be applied to vertical wells comprising single producers bracketed by injectors or the reverse.

The following references are incorporated by reference in their entirety for all purposes.
1. U.S. Pat. No. 6,230,814 Process for enhancing hydrocarbon mobility using a steam additive
2. U.S. Pat. No. 6,591,908 Hydrocarbon production process with decreasing steam and/or water/solvent ratio
3. U.S. Pat. No. 8,387,691 Low pressure recovery process for acceleration of in-situ bitumen recovery
4. US20130105147 Recovery From A Hydrocarbon Reservoir
5. US20150083413 Reducing solvent retention in ES-SAGD
6. US20160153270 Solvents and non-condensable gas co-injection.
7. US20160341021 Non-Condensable Gas Coinjection with Fishbone Lateral Wells

The invention claimed is:
1. A method for production of heavy oil, the method comprising:
    a) providing an array of wellpairs having 3 or more wellpairs, each wellpair comprising an injection well 2-10 meters over a production well positioned low in a payzone of a heavy oil reservoir;
    b) injecting steam and a hydrocarbon solvent into said injection wells of each of said array of wellpairs:
    c) producing heavy oil, water and hydrocarbon solvent at each production well by gravity drainage to said production well of each of said array of wellpairs for a period of time; and
    d) co-injecting a noncondensible gas (NCG) and steam into injection well of a first wellpair after said period of time, thus laterally sweeping heavy oil water and hydrocarbon solvent from said first wellpair towards an adjacent second wellpair at a lower pressure;
    e) producing heavy oil, water and hydrocarbon solvent at a production well of said second wellpair;
    f) co-injecting a noncondensible gas (NCG) and steam into an injection well of said first wellpair and an injection well of said second wellpairs, thus laterally sweeping heavy oil water and hydrocarbon solvent from said first and second wellpairs towards a next adjacent third wellpair at a lower pressure; and g) producing heavy oil, water and hydrocarbon solvent at a production well of said third wellpair.

2. The method of claim 1, repeating steps f)-g) one or more times for subsequent adjacent wellpairs, thereby providing a tapered lateral sweep over said array of wellpairs.

3. The method of claim 1, wherein the hydrocarbon solvent is selected from C5-C9 hydrocarbons, C5-C10 hydrocarbons, C5-C14 hydrocarbons, pentane, hexane, heptane, octane, nonane, decane, undecane, dodecane, tridecane, tetradecane, linear and cyclic paraffins, diluent, kerosene, Stoddard solvent, naphtha, and mixtures thereof.

4. The method of claim 1, wherein said NCG are selected from the group consisting of air, carbon dioxide (CO2), nitrogen (N2), carbon monoxide (CO), hydrogen sulfide (H2S), hydrogen (H2), anhydrous ammonia (NH3), flue gas, and combinations thereof.

5. The method of claim 1, wherein both the injection well and the production well of a wellpair are used for co-injecting steps d) and f).

6. The method of claim 1, wherein the lateral sweep is towards an adjacent wellpair having a lower pressure and a shut in injector well.

7. An improved method of expanding solvent steam assisted gravity drainage (ES-SAGD) production of heavy oil wherein steam and hydrocarbon solvent are coinjected into a heavy oil reservoir and water, hydrocarbon solvent and heavy oil are produced by gravity drainage in each of an array of wellpairs having three or more wellpairs, the improvement comprising:
   a) performing ES-SAGD for a period of time in each of said array of wellpairs until oil recovery reaches about 20-30% of oil in place,
   b) then changing to co-injecting steam and NCG into an injection well of a first wellpair to sweep remaining oil from said first wellpair to a production well of an adjacent wellpair at lower pressure,
   c) recovering remaining oil at said production well of said adjacent wellpair, and
   d) repeating steps b) and c) over a next adjacent wellpair to perform a tapered lateral sweep over said array of wellpairs.

8. The method of claim 7, wherein more hydrocarbon solvent is recovered than is recovered with ES-SAGD used alone.

9. The method of claim 7, wherein a lower cumulative steam-oil ratio is achieved with said method as compared to using ES-SAGD alone.

10. The method of claim 7, wherein the hydrocarbon solvent is selected from C5-C9 hydrocarbons, C5-C10 hydrocarbons, C5-C14 hydrocarbons, pentane, hexane, heptane, octane, nonane, decane, undecane, dodecane, tridecane, tetradecane, linear and cyclic paraffins, diluent, kerosene, Stoddard solvent, naphtha, and mixtures thereof.

11. The method of claim 7, wherein said NCG are selected from the group consisting of air, carbon dioxide (CO2), nitrogen (N2), carbon monoxide (CO), hydrogen sulfide (H2S), hydrogen (H2), anhydrous ammonia (NH3), flue gas, and combinations thereof.

12. The method of claim 7, wherein both the injection well and production well of a wellpair are used for injection in the tapered lateral sweep towards an adjacent wellpair having a lower pressure.

13. The method of claim 7, wherein the tapered lateral sweep is towards an adjacent wellpair having a lower pressure and a shut in injector well.

14. An improved method of ES-SAGD production of heavy oil wherein steam and hydrocarbon solvent are co-injected into an injection well in a heavy oil reservoir and water, hydrocarbon solvent and heavy oil are produced by gravity drainage at a production well that is paired with and below said injection well, the improvement comprising:
   a) performing ES-SAGD injection and production in an array of wellpairs for a period of time until oil recovery reaches about 20-30% of oil in place;
   b) thereafter switching to co-injecting noncondensible gas (NCG) and steam into an injection well of a first wellpair to a perform a tapered lateral sweep using said NCG and steam co-injection at said injection well;
   c) recovering heavy oil, water and hydrocarbon solvent and at a production well of an adjacent second wellpair at lower pressure than said first wellpair; and
   d) progressively driving oil using said tapered lateral sweep over an said array of wellpairs.

15. The method of claim 14, wherein more hydrocarbon solvent is recovered than is recovered with ES-SAGD used alone.

16. The method of claim 14, wherein a lower cumulative steam-oil ratio is achieved with said method as compared to using ES-SAGD alone.

17. The method of claim 14, wherein the hydrocarbon solvent is selected from C5-C9 hydrocarbons, C5-C10 hydrocarbons, C5-C14 hydrocarbons, pentane, hexane, heptane, octane, nonane, decane, undecane, dodecane, tridecane, tetradecane, linear and cyclic paraffins, diluent, kerosene, Stoddard solvent, naphtha, and mixtures thereof.

18. The method of claim 14, wherein said NCG are selected from the group consisting of air, carbon dioxide (CO2), nitrogen (N2), carbon monoxide (CO), hydrogen sulfide (H2S), hydrogen (H2), anhydrous ammonia (NH3), flue gas, and combinations thereof.

19. The method of claim 14, wherein both the injection well and production well of a wellpair are used for co-injecting in the tapered lateral sweep towards an adjacent wellpair having a lower pressure.

20. The method of claim 14, wherein the tapered lateral sweep is towards an adjacent wellpair having a lower pressure and a shut in injector well.

21. An improved method of ES-SAGD production of heavy oil, wherein steam and hydrocarbon solvent are co-injected into an injection well in a heavy oil reservoir and water, hydrocarbon solvent and heavy oil are produced by gravity drainage at a production well that is paired with and below said injection well, the improvement comprising:
   a) performing ES-SAGD injection and production in each of an array of wellpairs for a period of time until oil recovery reaches about 20-30% of oil in place;
   b) thereafter co-injecting noncondensible gas (NCG) and steam into both an injection well and a production well of a first wellpair;
   c) recovering heavy oil, water and hydrocarbon solvent at a production well of an adjacent second wellpair at lower pressure than said first wellpair; and
   d) progressively driving oil to next adjacent wellpairs by repeating steps b) and c) over said array of wellpairs.

* * * * *